(12) United States Patent
Wang et al.

(10) Patent No.: US 8,593,841 B2
(45) Date of Patent: Nov. 26, 2013

(54) COMPENSATION CIRCUIT FOR CONSTANT CURRENT REGULATION OF POWER SUPPLY AND METHOD THEREOF

(75) Inventors: Siran Wang, Hangzhou (CN); Yuancheng Ren, Hangzhou (CN); Junming Zhang, Hangzhou (CN); En Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 258 days.

(21) Appl. No.: 13/289,274

(22) Filed: Nov. 4, 2011

(65) Prior Publication Data
US 2012/0113684 A1 May 10, 2012

(30) Foreign Application Priority Data
Nov. 4, 2010 (CN) .......................... 2010 1 0538049

(51) Int. Cl.
*H02J 3/12* (2006.01)
*G05F 1/00* (2006.01)
*H02M 3/335* (2006.01)

(52) U.S. Cl.
USPC .......... 363/73; 323/243; 323/288; 363/21.16; 363/21.17

(58) Field of Classification Search
USPC ................. 323/242, 243, 274, 284, 288, 312, 323/315–317; 363/21.01, 21.16, 21.17, 363/21.18, 39, 41, 73
See application file for complete search history.

(56) References Cited

U.S. PATENT DOCUMENTS

| | | | |
|---|---|---|---|
| 5,729,443 A * | 3/1998 | Pavlin | 363/21.12 |
| 7,061,225 B2 * | 6/2006 | Yang et al. | 324/103 P |
| 7,339,804 B2 * | 3/2008 | Uchida | 363/56.1 |
| 7,372,241 B1 * | 5/2008 | Tomiyoshi | 323/288 |
| 7,403,049 B2 * | 7/2008 | Uchimoto et al. | 327/131 |
| 2003/0020442 A1 * | 1/2003 | Hwang | 323/288 |

* cited by examiner

*Primary Examiner* — Adolf Berhane
*Assistant Examiner* — Gary Nash
(74) *Attorney, Agent, or Firm* — Perkins Coie LLP

(57) ABSTRACT

A compensation circuit and method for constant current regulation of switching mode power supply are disclosed. The ringing waveform of a feedback signal, indicative of the output current of the power supply, causes error. To eliminate the error, a current source charges a capacitor in response to a demagnetizing oscillation signal indicative of the error caused by the ringing waveform of the feedback signal. The voltage across the capacitor is compared to a reference signal to generate a more accurate signal indicative of the conductive time of a secondary diode in a secondary winding of the switching mode power supply. This more accurate signal is inputted to a logic circuit to generate a constant current control signal to control a power switch of the power supply.

20 Claims, 6 Drawing Sheets

COMPENSATION CIRCUIT FOR CONSTANT CURRENT REGULATION OF POWER SUPPLY AND METHOD THEREOF

CROSS-REFERENCE TO RELATED APPLICATION(S)

This application claims priority to and the benefit of Chinese Patent Application No. 201010538049.4, filed Nov. 4, 2010, which is incorporated herein by reference in its entirety.

TECHNICAL FIELD

The present disclosure relates generally to power supplies, and more particularly but not exclusively to constant current controller.

BACKGROUND

There are many control methods for controlling an output current in switching mode power supplies (SMPS). BCD Semiconductor provides a primary side controller AP3708 (Preliminary Datasheet, Rev.1.0, 2008.09, http://www.bcd-semi.com) for controlling an output voltage and an output current. FIG. 1A schematically shows a switching mode power supply incorporating the controller AP3708.

In FIG. 1A, an input signal is applied to a first terminal of a primary winding Np. A second terminal of the primary winding Np is coupled to a transistor Q1, which is controlled to be on and off by the controller AP3708. When the transistor Q1 is turned on, a primary current Ip flows through the primary winding Np, which starts building up a magnetic energy. A secondary winding Ns coupled with a secondary diode D1 and a capacitor Co is magnetically coupled to the primary winding Np, wherein the capacitor Co has a relatively high capacity to stabilize the variation of a voltage Vo supplying to a load. The polarity (winding sense) of the secondary winding Ns is configured such that the magnetic field produced by the primary current Ip (when the transistor Q1 is turned on) induces a voltage that reverse biases the secondary diode D1. When the transistor Q1 is turned off, the sign of the time derivative of the magnetic field is reversed and a current Is is induced in the secondary winding Ns. A part of the current Is charges the capacitor Co and the rest is supplied to the load Ro. The capacitor Co maintains an output current Io flowing in the load by partly discharging while the secondary current Is stops flowing. This is the case when the energy in the magnetic field has been completely discharged.

In order to maintain a constant current at the load Ro, an auxiliary winding $N_{AUX}$ may be used. In this example, the auxiliary winding $N_{AUX}$ has the same polarity as that of the secondary winding Ns, and is coupled with a auxiliary diode D2 and a capacitor $C_{AUX}$. The auxiliary diode D2 coupled to the auxiliary winding $N_{AUX}$ is also reverse biased when the transistor Q1 is turned on; and an induced current is flowing through the auxiliary winding $N_{AUX}$ when the transistor Q1 is turned off. The induced current flowing through the auxiliary winding $N_{AUX}$ could be used as an indicator for the controller AP3708 to control switching the transistor Q1 to obtain a constant load current. However, the induced current could not be easily monitored. An alternative solution is to monitor a voltage waveform at the node 101 of the auxiliary winding $N_{AUX}$. A resistor R1 is coupled to the node 101 to pick up the voltage waveform at the node 101, which may be further attenuated with a resistor R2 to form a feedback signal $V_{FB}$ at the node 102. In one embodiment, the feedback signal $V_{FB}$ may be an image of the voltage Vs across the secondary winding Ns, i.e., $V_{FB}$ is in the first order linearly proportional to the voltage at node 103 adjusted by a turns ratio and the voltage divider ratio.

While the transistor Q1 is turned on, the primary current Ip flows through a current sensing resistor Rcs, which produces a voltage Vcs to the controller AP3708. In one embodiment, the transistor Q1 is turned on when Vcs is below a predetermined value, and the transistor Q1 is turned off when Vcs is above the predetermined value.

FIG. 1B schematically shows a block diagram of the controller AP3708. In FIG. 1B, the constant current control circuit of the controller AP3708 comprises: a first comparator 201, a Tons (Tons represents the conduction time of the secondary diode D1) detector 202, a first current source 203, a second current source 204, a first switch 205, a second switch 206, a capacitor 207, a second comparator 208 and a flip-flop 209.

The feedback signal $V_{FB}$ is compared to a reference signal, e.g., 0.1 Volts by the comparator 201. When the feedback signal $V_{FB}$ is larger than 0.1 Volts, the comparator 201 generates a logical low signal. Otherwise, the comparator generates a logical high signal.

The output of the comparator 201 is coupled to the Tons detector 202. Based on the output of the comparator 201 and a signal pfm which controls the on and off of the transistor Q1, the Tons detector 202 generates a conduction time interval signal Tons indicative of the conduction of the secondary diode D1.

In FIG. 1B, the conduction time interval signal Tons and a non-conduction time interval signal Toffs, which is opposite from the signal Tons, have a ratio of 4/3, i.e., Tons has a relative interval time of 4 whereas Toffs has a relative interval time of 3.

The capacitor 207 is charged by the first current source 203 when the first switch 205 is turned on and is discharged by the second current source 204 when the second switch 206 is turned on. The first switch 205 and the second switch 206 is controlled by the signal Tons. An inverter 210 allows the second switch 206 to be off (i.e., open) when the first switch 205 is turned on (i.e., closed), and to be on when the first switch 205 is turned off. The ratio of the first current source 203 and the second current source 204 is fixed to 4/3.

When the controller AP3708 works under constant current mode, Tons/Toffs=4/3, wherein Toffs=T−Tons, and T represents a switching cycle time period of the transistor Q1. Ideally, when the controller AP3708 works under constant current mode, the output current is:

$$Io = \frac{1}{2} \times n \times Ipk \times \frac{Tons}{T} \qquad (1)$$

Wherein Ipk represents the peak current of the primary winding Np, and n represents the turn ratio of the primary winding Np and the secondary winding Ns. So n×Ipk represents the peak current of the current flowing through the secondary winding Ns.

In a given system, n and Ipk are fixed. The output current Io could be constant by fixing the ratio of the cycle time T and the conduction time interval signal Tons. So detecting and controlling the conduction time interval signal Tons is the key to the constant current control. The common way to generate the signal Tons is to detect the zero cross of the voltage $V_{AUX}$ across the auxiliary winding $N_{AUX}$. The controller AP3708 gets the conduction time interval signal Tons by comparing the feedback signal $V_{FB}$ to a reference signal 0.1V.

In real world application, when the secondary diode D1 is turned off, the voltage $V_{AUX}$ across the auxiliary winding $N_{AUX}$ will cross zero after a demagnetizing oscillation, which means that when the voltage Vs across the secondary winding Ns reduces to zero, the feedback signal $V_{FB}$ is still larger than zero because of the demagnetizing oscillation of the auxiliary winding $N_{AUX}$. FIG. 2 shows typical waveforms of the feedback signal $V_{FB}$ and the current Is flowing through the secondary winding when the transistor Q1 is turned on and off. At time $t_0$, the transistor Q1 is turned off, and the energy of the magnetic field in the primary winding Np is transferred to the respective secondary and auxiliary windings Ns and $N_{AUX}$. The secondary diode D1 and the auxiliary diode D2 are conducted. Accordingly, a peak current Ipk flows through the secondary diode D1, and the feedback signal $V_{FB}$ shows some ringing or oscillations before settling down to an average value while the current Is is flowing. At time $t_1$, the energy of the magnetic field stored in the primary winding Np is completely discharged, there are no currents flowing in the primary, secondary and auxiliary windings. As the current Is flowing through the secondary winding Ns drops to zero, the feedback signal $V_{FB}$ shows a series of undershoots and overshoots with damping magnitudes around the ground potential. The undershoots and overshoots have a damped sinusoid ringing waveform with an approximately constant frequency, and the DC level of the ringing waveform is zero. At time $t_4$, the transistor Q1 is turned on, $V_{FB}$ is going negative, i.e., the secondary diode D1 and the diode coupled to the auxiliary winding $N_{AUX}$ are reverse-biased. The current Ip starts to flow through the primary winding Np, which stores the energy of the magnetic field and releases it again to the secondary Ns and the auxiliary windings $N_{AUX}$ at time $t_0'$ when transistor Q1 is turned off. The frequency f of the sinusoidal ringing waveform is determined by the inductance Lp of the primary winding Np, its parasitic capacitance, and the other capacitances related to the PCB layout of the power supply. The frequency f of the sinusoidal ringing waveform is calculated by the following expression:

$$f = \frac{1}{2\pi \sqrt{Lp \times Ctot}} \quad (2)$$

Wherein Ctot represents the total capacitance. So a period T of the sinusoidal ringing waveform is:

$$T = 2\pi \sqrt{Lp \times Ctot} \quad (3)$$

As shown in FIG. 2, while the current Is drops to zero at time $t_1$, the feedback signal $V_{FB}$ is not yet zero due to the ringing waveform. In some examples, the feedback signal $V_{FB}$ goes to zero after approximately a quarter of one cycle period of the sinusoidal. When a PWM (pulse width modulation) or PFM (pulse frequency modulation) controller utilizes the zero crossing of the feedback signal $V_{FB}$ as an indicator for the conduction time of the diode D1, as shown in FIG. 2, an error $\Delta T$ is likely to be included, which corresponds to about a quarter of one cycle period of the sinusoidal waveform.

FIG. 3 schematically shows the section of the constant current control circuit of the controller AP3708. The value of the first current source 203 is marked as 4I and the value of the second current source 204 is marked as 3I for illustration purpose. Ideally, when the controller AP3708 works under constant current mode, Tons/Toffs=4/3. If the error $\Delta T$ is considered, we could get the expression:

$$3I \times (Tons + \Delta T) = 4I \times (Toffs - \Delta T) \quad (4)$$

Substitution of Eq. (4) into Eq. (1) and the solution for the signal Tons yields:

$$Io = \frac{2}{7} \times n \times Ipk \times \frac{Tons}{Tons + \Delta T} = \frac{2 \times n \times Lp \times Ipk^2}{7(Lp \times Ipk + n \times \Delta T \times Vo)} \quad (5)$$

Wherein Vo represents the output voltage of the secondary winding. As seen from FIG. 2, the real zero cross of the voltage $V_{FB}$ is happened at $t_2$ because of the demagnetizing oscillation. In Eq. (5), $n\Delta TVo$ is an error in the output current Io caused by the error $\Delta T$ in the time interval of the signal Tons. The output voltage Vo is varied with the load in constant current control mode, thus the output current Io could not be constant because of the varying error $n\Delta TVo$.

To solve the above problem, there are several methods. For example, technology in the patent application US 2010/0238689 suggests compensating the time error to the conduction time interval signal Tons. It may solve the problem, but complicated circuits and a substantially similar capacitor set are needed to be configured. Also, a pair of substantially similar capacitor needed in the patent application US 2010/0238689 is hard to realize in real world.

The present disclosure provides a precisely controlled constant current controller which is realized with simple circuit.

SUMMARY

It is an object of the present disclosure to provide a circuit and a method for constant current regulation of power supplies.

In accomplishing the above and other objects, there has been provided, in accordance with an embodiment of the present disclosure, a constant current controller for a switching mode power supply (SMPS), wherein the switching mode power supply includes a transformer having a primary winding coupled with a power switch and a secondary winding coupled with a secondary diode, the power switch is controlled by a control signal, the controller comprising: a detector circuit having a first input terminal, a second input terminal, a first output terminal and a second output terminal, wherein the first input terminal is configured to receive a feedback signal, the second input terminal is configured to receive a control signal, and based on the feedback signal and the control signal, the detector circuit generates and provides at the first output terminal a conduction time interval signal indicative of a conduction time of the secondary diode, and the detector circuit generates and provides at the second output terminal a demagnetizing oscillation signal; a first comparator having a first input terminal, a second input terminal, and an output terminal, wherein the first input terminal is coupled to a first reference signal; a first current source and a first switch coupled in series between an internal power signal and the second input terminal of the first comparator; a second current source and a second switch coupled in series between the second input terminal of the first comparator and a reference ground; a capacitor coupled between the second input terminal of the first comparator and the reference ground to provide a voltage across the capacitor to the second input terminal of the first comparator, wherein the first comparator generates and provides at the first comparator output terminal a first comparison signal based on the voltage across the capacitor and the first reference signal; a third current source and a third switch coupled in series between the internal power signal and the second input terminal of the first comparator; and a flip-flop having a first input terminal, a second input terminal and an output terminal, wherein the first input terminal is coupled to the first output terminal of the detector circuit to receive the conduction time interval signal, the second input terminal is coupled to the output terminal of the first comparator to receive the first comparison signal, and wherein based on the conduction time interval signal and the first comparison signal, the flip-flop provides a constant current control signal at the output terminal, wherein the control signal is based on the constant current control signal; wherein the first switch and the second switch are controlled by the conduction time interval signal, and the third switch is controlled by the demagnetizing oscillation signal.

In accomplishing the above and other objects, there has been provided, in accordance with another embodiment of the present disclosure, a switching mode power supply (SMPS), comprising: a primary winding coupled between an input power signal and a power switch; a secondary winding configured to supply power to a load; an auxiliary winding configured to provide a feedback signal indicative of a current flowing through the secondary winding; a control circuit providing a constant current control signal, the control circuit including: a detector circuit configured to receive the feedback signal, and a control signal, wherein the control signal is related to the constant current control signal, and the feedback signal exhibits a ringing waveform when the current flowing through the secondary winding reduced to zero, and wherein based on the feedback signal and the control signal, the detector provides a conduction time interval signal and a demagnetizing oscillation signal; a first current source controlled by the conduction time interval signal to charge a capacitor; a second current source controlled by the conduction time interval signal to discharge the capacitor; a third current source controlled by the demagnetizing oscillation signal to charge the capacitor; a first comparator configured to compare a voltage across the capacitor to a first reference signal, and based on the voltage across the capacitor and the first reference signal, the first comparator generates a first comparison signal; and a flip-flop configured to receive the conduction time interval signal and the first comparison signal, and based on the conduction time interval signal and the first comparison signal, the flip-flop provides the constant current control signal at the output terminal.

Furthermore, there has been provided, in accordance with an embodiment of the present disclosure, a method for compensating an error in a feedback signal of a switching mode power supply, wherein the switching mode power supply includes a transformer having a primary winding coupled with a power switch and a secondary winding coupled with a secondary diode, the method comprising: generating a feedback signal indicative of a current flowing through the secondary diode, wherein the feedback signal exhibiting ringing waveform when the current flowing through the secondary diode decreases to zero; generating a second comparison signal by comparing the feedback signal to a second reference signal; generating a conduction time interval signal in response to the second comparison signal and a control signal, wherein the control signal controls the power switch; generating a demagnetizing oscillation signal indicative of the error caused by the ringing waveform of the feedback signal in response to the second comparison signal and the conduction time interval signal; charging a capacitor in response to the conduction time interval signal and the demagnetizing oscillation signal and discharging the capacitor in response to the conduction time interval signal to get a voltage across the capacitor; generating a first comparison signal by comparing the voltage across the capacitor to a first reference signal; and generating a constant current control signal in response to the first comparison signal and the conduction time interval signal, wherein the control signal is related to the constant current control signal.

These and other features of the present disclosure will be readily apparent to persons of ordinary skill in the art upon reading the entirety of this disclosure, which includes the accompanying drawings and claims.

The use of the same reference label in different drawings indicates the same of like components.

DETAILED DESCRIPTION

In the present disclosure, numerous specific details are provided, such as examples of circuits, components, and methods, to provide a thorough understanding of embodiments of the disclosure. Persons of ordinary skill in the art will recognize, however, that the disclosure could be practiced without one or more of the specific details. In other instances, well-known details are not shown or described to avoid obscuring aspects of the disclosure.

Figure 1A:
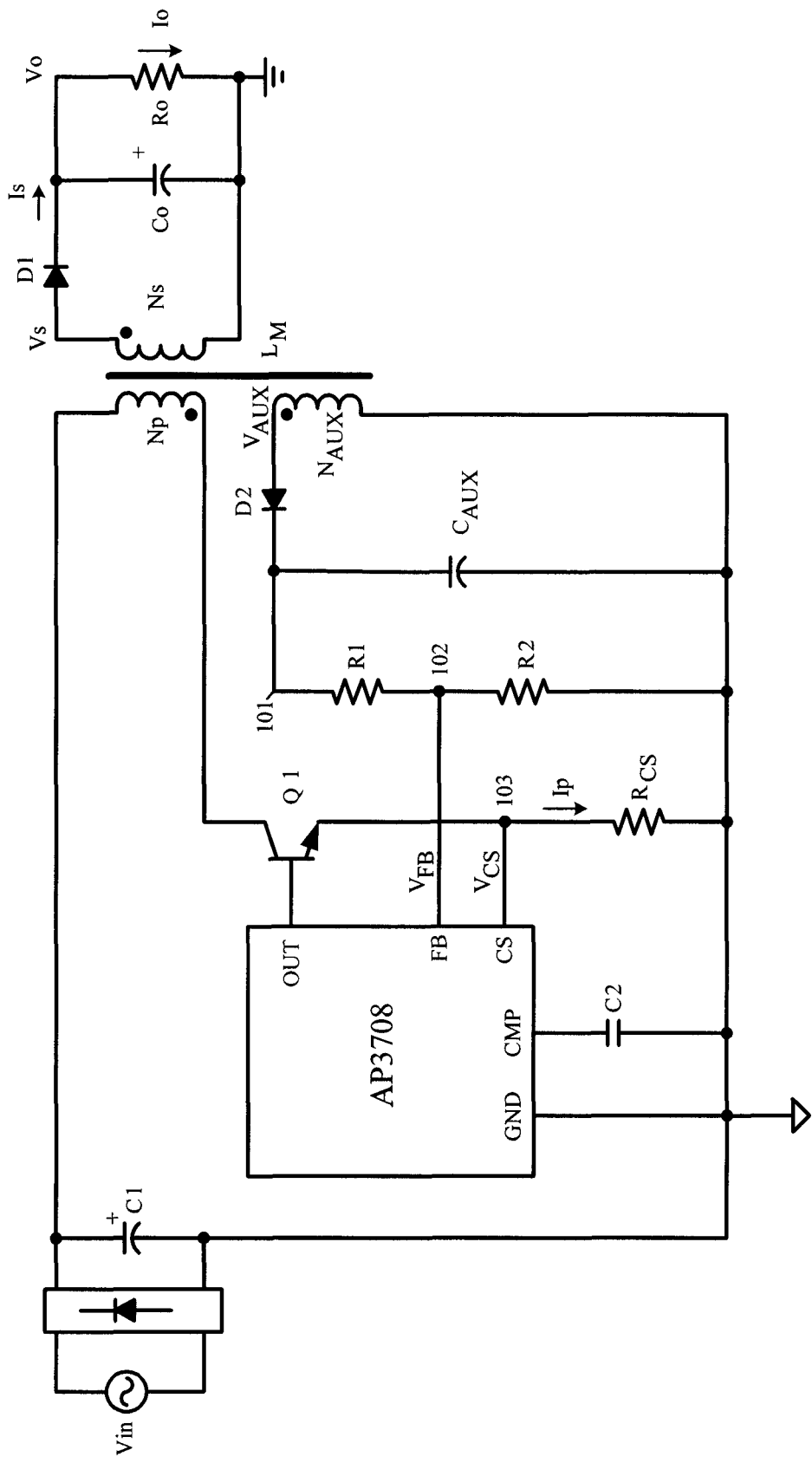
FIG. 1A schematically shows a switching mode power supply with a controller AP3708.
Figure 1B:
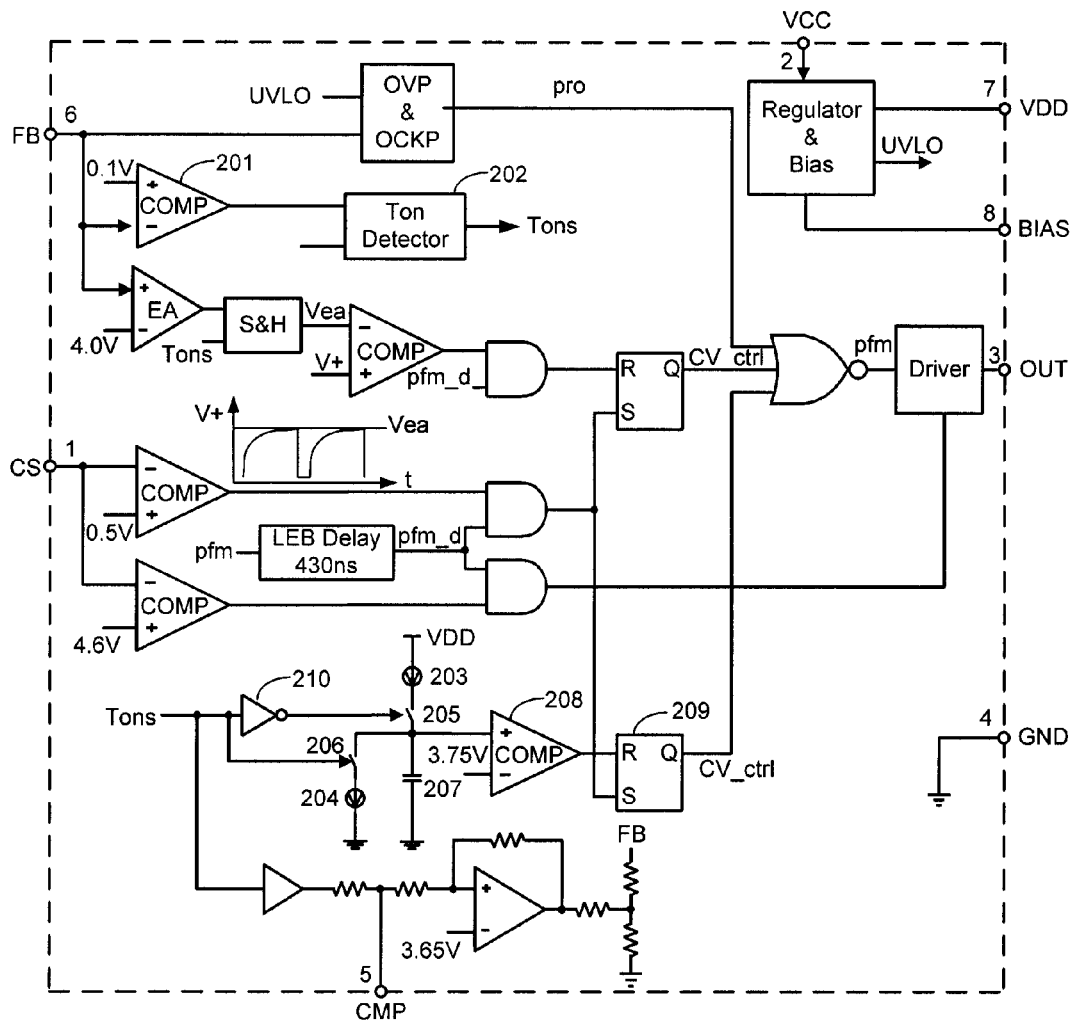
FIG. 1B schematically shows a block diagram of the controller AP3708.
Figure 2:
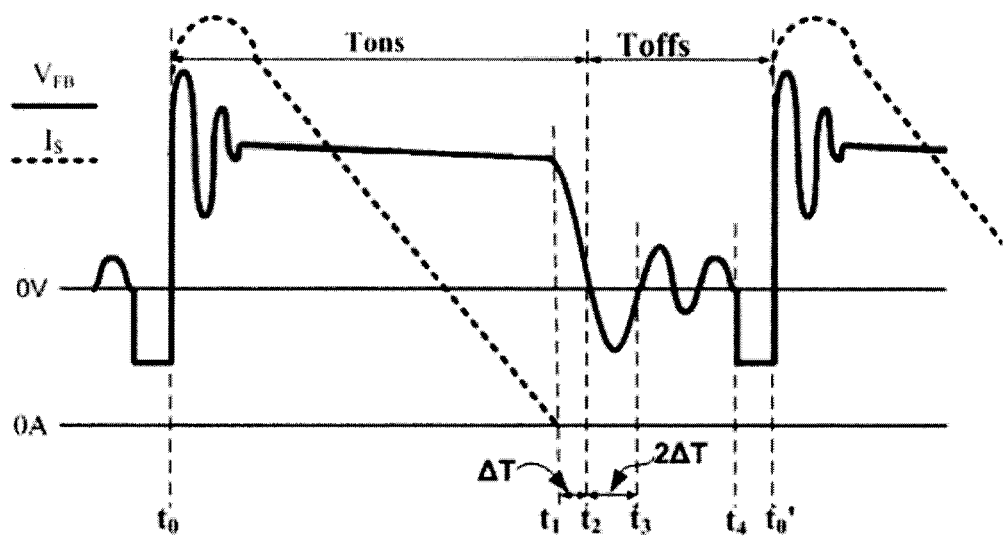
FIG. 2 shows typical waveforms of the feedback signal $V_{FB}$ and the current Is in the secondary winding when the transistor Q1 is turned on and off.
Figure 3:
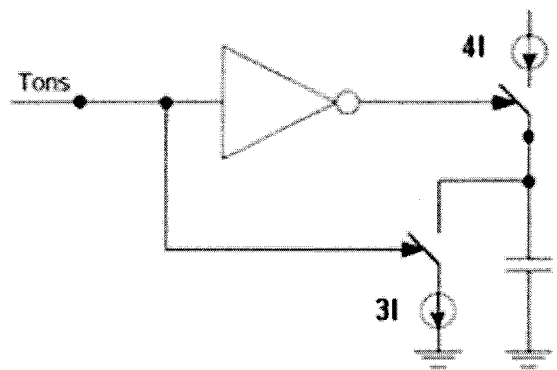
FIG. 3 schematically shows the section of the constant current control circuit of the controller AP3708.
Figure 4:
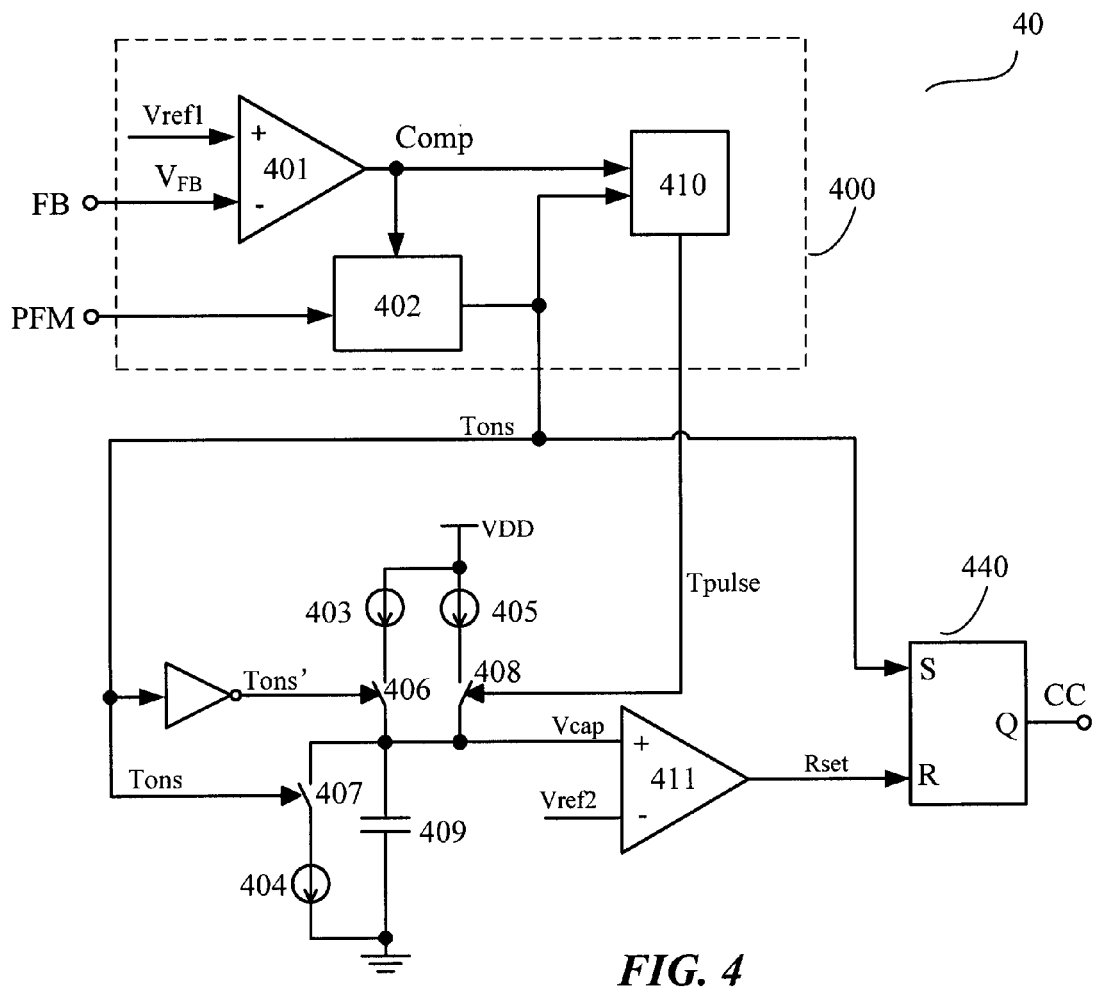
FIG. 4 schematically shows a constant current controller 40 for a switching mode power supply (SMPS) including a transformer having a primary winding equipped with a power switch in accordance with an embodiment of the present disclosure.

FIG. 4 schematically shows a constant current controller 40 for a switching mode power supply (SMPS) including a transformer having a primary winding coupled with a power switch and a secondary winding coupled with a secondary diode in accordance with an embodiment of the present disclosure. The constant current controller 40 comprises: a detector circuit 400 having a first input terminal, a second input terminal, a first output terminal, and a second output terminal, wherein the first input terminal is configured to receive the feedback signal $V_{FB}$, the second input terminal is configured to receive a control signal PFM, and based on the feedback signal $V_{FB}$ and the control signal PFM, the detector circuit 400 generates a conduction time interval signal Tons indicative of the conduction time of the secondary diode D1 at the first output terminal and generates a demagnetizing oscillation signal Tring at the second output terminal; wherein the control signal PFM is related to the constant current control signal; a first comparator 411 having a first input terminal, a second input terminal, and an output terminal, wherein the first input terminal is coupled to a first reference signal Vref1; a first current source 403 and a first switch 406 coupled in series between an internal power signal VDD and the second input terminal of the first comparator 411; a second current source 404 and a second switch 407 coupled in series between the second input terminal of the first comparator 411 and a reference ground; a capacitor 409 coupled between the second input terminal of the first comparator 411 and the reference ground to provide a voltage Vcap across the capacitor 409 to the second input terminal of the first comparator 411, wherein the first comparator 411 generates a first comparison signal Rset at its output terminal based on the voltage Vcap across the capacitor 409 and the first reference signal Vref1; a third current source 405 and a third switch 408 coupled in series between the internal power signal VDD and the second input terminal of the first comparator 411; and a flip-flop 440 having a first input terminal, a second input terminal and an output terminal CC, wherein the first input terminal is coupled to the first output terminal of the detector circuit 400 to receive the conduction time interval signal Tons, the second input terminal is coupled to the output terminal of the first comparator 411 to receive the first comparison signal Rset, and wherein based on the conduction time interval signal Tons and the first comparison signal Rset, the flip-flop 440 provides the constant current control signal at the output terminal CC; wherein the first switch 406 and the second switch 407 are controlled by the conduction time interval signal Tons, and the third switch 408 is controlled by the demagnetizing oscillation signal Tring.

In one embodiment, the internal power signal VDD is coupled to an input power signal supplied to the switching mode power supply. In other embodiments, the internal power signal VDD may be generated based on the input power signal.

In one embodiment, the constant current controller 40 further comprises a NOR gate configured to receive the constant current control signal and a constant voltage control signal, wherein based on the constant current control signal and the constant voltage control signal, the NOR gate generates the control signal PFM to control the power switch. In the embodiment of a power supply with only constant current control, the constant current control signal controls the on and off of the power switch.

In one embodiment, the detector circuit 400 comprises: a second comparator 401 having a first input terminal, a second input terminal and an output terminal, wherein the first input terminal is coupled to the first input terminal of the detector circuit 400 to receive the feedback signal $V_{FB}$, the second input terminal is configured to receive a second reference signal Vref2, and wherein based on the feedback signal $V_{FB}$ and the second reference signal Vref2, the second comparator 401 generates the second comparison signal Comp at the output terminal; a conduction time detector 402 having a first input terminal, a second input terminal and an output terminal, wherein the first input terminal is configured to receive the control signal PFM, the second input terminal is coupled to the output terminal of the second comparator 401 to receive the second comparison signal Comp, wherein the conduction time detector 402 generates the conduction time interval signal Tons at the output terminal based on the control signal PFM and the second comparison signal Comp; and a demagnetizing oscillation detector 410 having a first input terminal, a second input terminal and an output terminal, wherein the first input terminal is coupled to the output terminal of the conduction time detector 402 to receive the conduction time interval signal Tons, the second input terminal is coupled to the output terminal of the second comparator 401 to receive the second comparison signal Comp, and wherein based on the conduction time interval signal Tons and the second comparison signal Comp, the demagnetizing oscillation detector 410 generates the demagnetizing oscillation signal Tring at the output terminal.

In one embodiment, the second comparison signal Comp has at least one digital pulse, which is representative of a half-cycle of the ringing waveform.

In one embodiment, the second reference signal Vref2 has a magnitude of 0.1 Volts, and the first reference signal Vref1 has a magnitude of 3.75 Volts. Persons of ordinary skill in the art should know that the second reference signal Vref2 and the first reference signal Vref1 may have other magnitude. For example, the second reference signal Vref2 may be 0 Volts.

In one embodiment, the conduction time Tons of the secondary diode and the non-conduction time Toffs of the secondary diode have a ratio of 4/3, i.e., Tons has a relative interval time of 4 whereas Toffs has a relative interval time of 3. The 4/3 ratio of Tons/Toffs could be generated by using the capacitor 409 that is charged by the first current source 403 and is discharged by the second current source 404. The charge and discharge of the capacitor 409 produces a voltage signal Vcap, which is compared with the first reference signal Vref1 by the first comparator 411. The output of the first comparator 411 thus has a time ratio signal of 4/7 wherein 4 represents the relative time interval of Tons and 7 represents one cycle period of the voltage signal Vcap.

Figure 5:
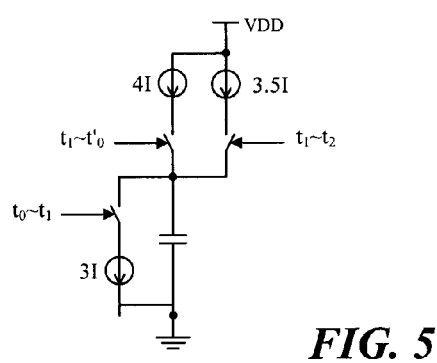
FIG. 5 schematically shows a part of the constant current controller 40 in accordance with an embodiment of the present disclosure.
Figure 6:
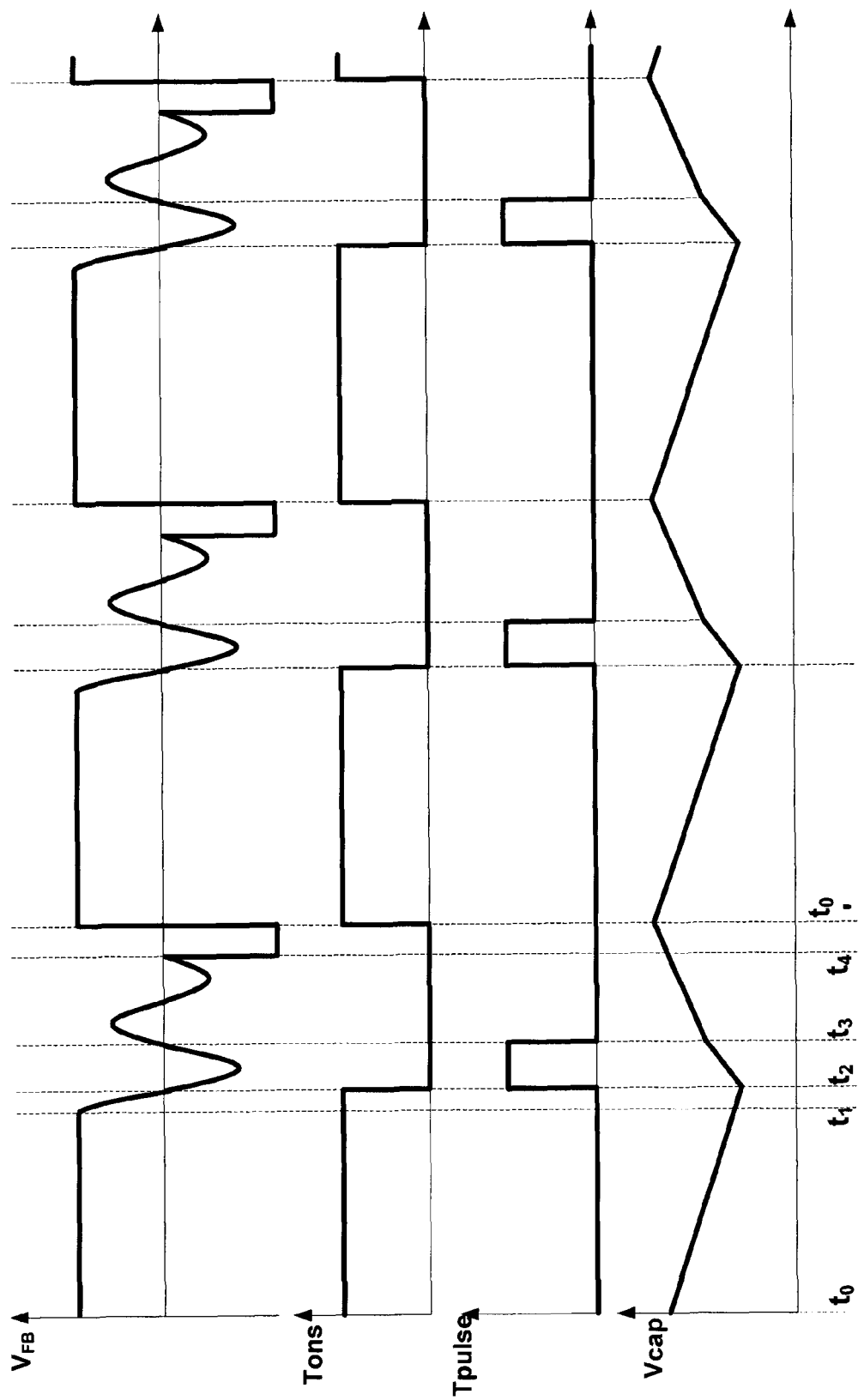
FIG. 6 shows the waveforms of the signals in FIG. 4.

FIG. 5 schematically shows a part of the constant current controller 40 in accordance with an embodiment of the present disclosure. FIG. 6 shows the waveforms of the signals in FIG. 4. The operation of the circuit in FIG. 4 is described with referring to FIGS. 4, 5 and 6.

As described above, the conduction time interval signal Tons is not an accurate representation of the conductive state of the secondary diode D1 because it is derived from the feedback signal $V_{FB}$ which exhibits a ringing waveform when the current Is drops to zero. This inaccurate representation of the conductive state of the secondary winding results in a variation of the output currents under different input power signals and output voltages.

In one embodiment, the first current source 403 has a current value of 4I, the second current source 404 has a current value of 3I, and the third current 405 has a current value of 3.5I, wherein I is a common factor of the three current sources. In the subinterval $t_2 \sim t_3$, which has a time period about $2\Delta T$, the third switch 408 is turned on, so the third current source 405 charges the capacitor 409. Thus Eq. (5) is rewritten as:

$$3I \times (Tons + \Delta T) = 4I \times (Toffs - \Delta T) + 3.5I \times 2\Delta T \qquad (6)$$

From the Eq. (6), we could have the expression:

$$3Tons + 3\Delta T = 4Toffs - 4\Delta T + 7\Delta T \qquad (7)$$

Because the third current source 405 charges the capacitor 409 according to the demagnetizing oscillation signal Tring, the on time interval and the off time interval of the secondary diode D1 is precisely fixed to a constant value 4/3, which means there would be no error in the output current. The output current Io could be written as:

$$Io = 2/7 \times n \times Ipk \qquad (8)$$

As seen from Eq. (8), the error $n\Delta T Vo$ in Eq. (5) caused by the ringing of the feedback signal $V_{FB}$ is eliminated.

Persons of ordinary skill in the art should know that the ratio Tons/Toffs could be other values. For example, assuming the current value of the first current source to be k1, and the current value of the second current source to be k2, the current value of the third current source would be (k1+k2)/2, wherein k1 and k2 could be any positive number. Eq. (6) is rewritten as:

$$k1 \times (Tons + \Delta T) = k2 \times (Toffs - \Delta T) + \frac{k1 + k2}{2} \times 2\Delta T \qquad (9)$$

The demagnetizing oscillation signal Tring which controls the third switch 408 may be obtained by detecting the zero crossing of the feedback signal $V_{FB}$ at time $t_2$ and $t_3$. FIG. 6 shows the relationship of the control signal PFM, the feedback signal $V_{FB}$ and the demagnetizing oscillation signal Tring. At time $t_2$, the ringing waveform of $V_{FB}$ reduces to zero, the second comparison signal Comp provided by the second comparator 401 turns to be logical high. The control signal PFM is logical low and the power switch is turned off now. In one embodiment, the conduction time detector 402 comprises an AND gate. The conduction time interval signal Tons is logical low in response to the high level of the second comparison signal Comp and the low level of the control signal PFM. The second comparison signal Comp and the conduction time interval signal Tons are coupled to the demagnetizing oscillation detector 410. In one embodiment, the demagnetizing oscillation detector 410 comprises a XOR gate (not shown) and a low level trigged flip-flop (not shown) controlled by the conduction time interval signal Tons. So when the demagnetizing oscillation detector 410 receives the signal Tons with low level and the signal Comp with high level, the demagnetizing oscillation detector 410 generates the signal Tring with high level. At time $t_3$, the ringing waveform of $V_{FB}$ crosses zero again and becomes larger than zero, the second comparison signal Comp provided by the second comparator 401 turns to be logical low. The control signal PFM is still logical low and the power switch is still turned off. So the conduction time interval signal Tons is logical low. The demagnetizing oscillation detector 410 generates the signal Tring with low level. The high level pulse of the demagnetizing oscillation signal Tring in the subinterval $t_2$-$t_3$ is latched up. Thus we could get the demagnetizing oscillation signal Tring has a pulse width of about $2\Delta T$. The demagnetizing oscillation signal Tring is used to control the third switch 408 to compensate the error caused by the ringing of the feedback signal $V_{FB}$.

Persons of ordinary skill in the art should know that the demagnetizing oscillation signal Tring may have a pulse width of $\Delta T$ or other value by changing the conduction time detector 402 or the demagnetizing oscillation detector 410 or both of them. When the pulse width of the demagnetizing oscillation signal Tring changes, the magnitude of the third current source 405 should change correspondingly. For example, when the pulse width of the demagnetizing oscillation signal is $\Delta T$, the magnitude of the third current source should be (k1+k2).

Figure 7:
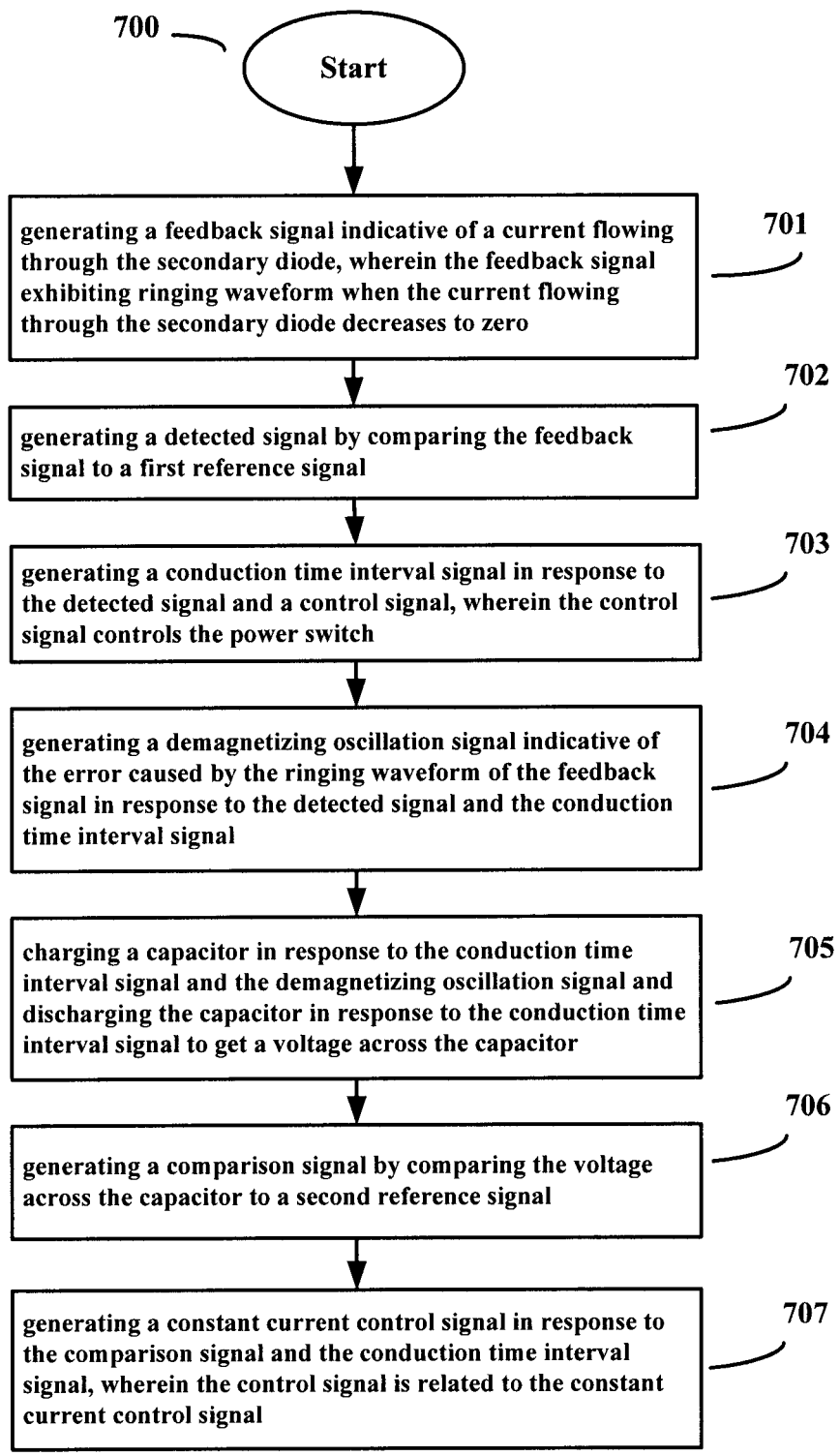
FIG. 7 shows a schematic flowchart 700 of a method of constant current control in accordance with an embodiment of the present disclosure.

FIG. 7 shows a schematic flowchart 700 of a method of constant current control in accordance with an embodiment of the present disclosure. The method comprises: step 701, generating a feedback signal indicative of a current flowing through the secondary diode, wherein the feedback signal exhibiting ringing waveform when the current flowing through the secondary diode decreases to zero; step 702, generating a second comparison signal by comparing the feedback signal to a second reference signal; step 703, generating a conduction time interval signal in response to the second comparison signal and a control signal, wherein the control signal controls the power switch; step 704, generating a demagnetizing oscillation signal indicative of the error caused by the ringing waveform of the feedback signal in response to the second comparison signal and the conduction time interval signal; step 705, charging a capacitor in response to the conduction time interval signal and the demagnetizing oscillation signal and discharging the capacitor in response to the conduction time interval signal to get a voltage across the capacitor; step 706, generating a first comparison signal by comparing the voltage across the capacitor to a first reference signal; and step 707, generating a constant current control signal in response to the first comparison signal and the conduction time interval signal, wherein the control signal is related to the constant current control signal.

In one embodiment, step 704 comprises: setting the demagnetizing oscillation signal to be high level at a falling edge of the conduction time interval signal; and setting the demagnetizing oscillation signal to be low level at a second zero crossing of the feedback signal.

In one embodiment, step 705 comprises: charging the capacitor by a first current source having a current of k1 when the conduction time interval signal is logical low; discharging the capacitor by a second current source having a current of k2 when the conduction time interval signal is logical high; and charging the capacitor by a third current source having a current value of (k1+k2)/2 when the demagnetizing oscillation signal is logical high; wherein k1 and k2 are positive numbers.

An effective technique for constant current control in a switching mode power supply has been disclosed. While specific embodiments of the present disclosure have been provided, it is to be understood that these embodiments are for illustration purposes and not limiting. Many additional embodiments will be apparent to persons of ordinary skill in the art reading this disclosure.

We claim:

1. A constant current controller for a switching mode power supply (SMPS), wherein the switching mode power supply includes a transformer having a primary winding coupled with a power switch and a secondary winding coupled with a secondary diode, the power switch is controlled by a control signal, the controller comprising:

a detector circuit having a first input terminal, a second input terminal, a first output terminal and a second output terminal, wherein the first input terminal is configured to receive a feedback signal, the second input terminal is configured to receive a control signal, and based on the feedback signal and the control signal, the detector circuit generates and provides at the first output terminal a conduction time interval signal indicative of a conduction time of the secondary diode, and the detector circuit generates and provides at the second output terminal a demagnetizing oscillation signal;

a first comparator having a first input terminal, a second input terminal, and an output terminal, wherein the first input terminal is coupled to a first reference signal;

a first current source and a first switch coupled in series between an internal power signal and the second input terminal of the first comparator;

a second current source and a second switch coupled in series between the second input terminal of the first comparator and a reference ground;

a capacitor coupled between the second input terminal of the first comparator and the reference ground to provide a voltage across the capacitor to the second input terminal of the first comparator, wherein the first comparator generates and provides at the first comparator output terminal a first comparison signal based on the voltage across the capacitor and the first reference signal;

a third current source and a third switch coupled in series between the internal power signal and the second input terminal of the first comparator; and a flip-flop having a first input terminal, a second input terminal and an output terminal, wherein the first input terminal is coupled to the first output terminal of the detector circuit to receive the conduction time interval signal, the second input terminal is coupled to the output terminal of the first comparator to receive the first comparison signal, and wherein based on the conduction time interval signal and the first comparison signal, the flip-flop provides a constant current control signal at the output terminal, wherein the control signal is based on the constant current control signal; wherein the first switch and the second switch are controlled by the conduction time interval signal, and the third switch is controlled by the demagnetizing oscillation signal.

2. The constant current controller of claim 1, wherein the flip-flop comprises a RS trigger.

3. The constant current controller of claim 1 wherein the detector circuit comprises:

a second comparator having a first input terminal, a second input terminal and an output terminal, wherein the first input terminal is coupled to the first input terminal of the detector circuit to receive the feedback signal, the second input terminal is configured to receive a second reference signal, and wherein based on the feedback signal and the second reference signal, the second comparator generates a second comparison signal at the output terminal;

a conduction time detector having a first input terminal, a second input terminal and an output terminal, wherein the first input terminal is configured to receive the control signal, the second input terminal is coupled to the output terminal of the second comparator to receive the second comparison signal, wherein the conduction time detector generates the conduction time interval signal at the output terminal based on the control signal and the second comparison signal; and a demagnetizing oscillation detector having a first input terminal, a second input terminal and an output terminal, wherein the first input terminal is coupled to the output terminal of the conduction time detector to receive the conduction time interval signal, the second input terminal is coupled to the output terminal of the second comparator to receive the second comparison signal, and wherein based on the conduction time interval signal and the second comparison signal, the demagnetizing oscillation detector generates the demagnetizing oscillation signal at the output terminal.

4. The constant current controller of claim 1, further comprises an inverter configured to inverse the conduction time interval signal, and wherein the first switch is controlled by the inversed conduction time interval signal and the second switch is controlled by the conduction time interval signal.

5. The constant current controller of claim 1, wherein the demagnetizing oscillation detector comprises a XOR gate and a low level trigged flip-flop controlled by the conduction time interval signal.

6. The constant current controller of claim 1, wherein the first current source has a current value of k1, the second current source has a current value of k2, and the third current source has a current value of (k1+k2)/2, and wherein k1 and k2 are positive numbers.

7. The constant current controller of claim 1, further comprises a NOR gate configured to receive the constant current control signal and a constant voltage control signal, wherein based on the constant current control signal and the constant voltage control signal, the NOR gate generates the control signal to control the power switch.

8. The constant current controller of claim 7, wherein the detector circuit comprises:

a second comparator having a first input terminal, a second input terminal and an output terminal, wherein the first input terminal is coupled to the first input terminal of the detector circuit to receive the feedback signal, the second input terminal is configured to receive a second reference signal, and wherein based on the feedback signal and the second reference signal, the second comparator generates a second comparison signal at the output terminal; and a conduction time detector having a first input terminal, a second input terminal and an output terminal, wherein the first input terminal is configured to receive the control signal, the second input terminal is coupled to the output terminal of the second comparator to receive the second comparison signal, wherein the conduction time detector generates the conduction time interval signal at the output terminal based on the control signal and the second comparison signal; and a demagnetizing oscillation detector having a first input terminal, a second input terminal and an output terminal, wherein the first input terminal is coupled to the output terminal of the conduction time detector to receive the conduction time interval signal, the second input terminal is coupled to the output terminal of the second comparator to receive the second comparison signal, and wherein based on the conduction time interval signal and the second comparison signal, the demagnetizing oscillation detector generates a demagnetizing oscillation signal at the output terminal.

9. The constant current controller of claim 7, further comprises an inverter configured to inverse the conduction time interval signal, and wherein the first switch is controlled by the inversed conduction time interval signal and the second switch is controlled by the conduction time interval signal.

10. The constant current controller of claim 7, wherein the demagnetizing oscillation detector comprises a XOR gate and a low level trigged flip-flop controlled by the conduction time interval signal.

11. The constant current controller of claim 7, wherein the first current source has a current value of k1, the second current source has a current value of k2, and the third current source has a current value of (k1+k2)/2, and wherein k1 and k2 are positive numbers.

12. A method for compensating an error in a feedback signal of a switching mode power supply, wherein the switching mode power supply includes a transformer having a primary winding coupled with a power switch and a secondary winding coupled with a secondary diode, the method comprising:

generating a feedback signal indicative of a current flowing through the secondary diode, wherein the feedback signal exhibiting ringing waveform when the current flowing through the secondary diode decreases to zero;

generating a second comparison signal by comparing the feedback signal to a second reference signal;

generating a conduction time interval signal in response to the second comparison signal and a control signal, wherein the control signal controls the power switch;

generating a demagnetizing oscillation signal indicative of the error caused by the ringing waveform of the feedback signal in response to the second comparison signal and the conduction time interval signal;

charging a capacitor in response to the conduction time interval signal and the demagnetizing oscillation signal and discharging the capacitor in response to the conduction time interval signal to get a voltage across the capacitor;

generating a first comparison signal by comparing the voltage across the capacitor to a first reference signal; and generating a constant current control signal in response to the first comparison signal and the conduction time interval signal, wherein the control signal is related to the constant current control signal.

13. The method of claim 12, wherein generating a demagnetizing oscillation signal indicative of the error caused by the ringing waveform of the feedback signal in response to the second comparison signal and the conduction time interval signal comprises:

setting the demagnetizing oscillation signal to be high level at a falling edge of the conduction time interval signal; and setting the demagnetizing oscillation signal to be low level at a second zero crossing of the feedback signal.

14. The method of claim 12, wherein charging a capacitor in response to the conduction time interval signal and the demagnetizing oscillation signal and discharging the capacitor in response to the conduction time interval signal to get a voltage across the capacitor comprises:

charging the capacitor by a first current source having a current of k1 when the conduction time interval signal is logical low;

discharging the capacitor by a second current source having a current of k2 when the conduction time interval signal is logical high; and charging the capacitor by a third current source having a current value of (k1+k2)/2 when the demagnetizing oscillation signal is logical high; wherein k1 and k2 are positive numbers.

15. A switching mode power supply (SMPS), comprising:

a primary winding coupled between an input power signal and a power switch;

a secondary winding configured to supply power to a load;

an auxiliary winding configured to provide a feedback signal indicative of a current flowing through the secondary winding;

a control circuit providing a constant current control signal, the control circuit including:

a detector circuit configured to receive the feedback signal, and a control signal, wherein the control signal is related to the constant current control signal, and the feedback signal exhibits a ringing waveform when the current flowing through the secondary winding reduced to zero, and wherein based on the feedback signal and the control signal, the detector provides a conduction time interval signal and a demagnetizing oscillation signal;

a first current source controlled by the conduction time interval signal to charge a capacitor;

a second current source controlled by the conduction time interval signal to discharge the capacitor;

a third current source controlled by the demagnetizing oscillation signal to charge the capacitor;

a first comparator configured to compare a voltage across the capacitor to a first reference signal, and based on the voltage across the capacitor and the first reference signal, the first comparator generates a first comparison signal; and a flip-flop configured to receive the conduction time interval signal and the first comparison signal, and based on the conduction time interval signal and the first comparison signal, the flip-flop provides the constant current control signal at the output terminal.

16. The power supply of claim 15, wherein the detector circuit comprises:

a second comparator configured to compare the feedback signal with the second reference signal, to produce the second comparison signal having at least one digital pulse;

a conduction time detector configured to receive the control signal and the second comparison signal, and wherein based on the control signal and the second comparison signal, the conduction time detector generates the conduction time interval signal; and a demagnetizing oscillation detector configured to receive the conduction time interval signal and the second comparison signal, and wherein based on the conduction time interval signal and the second comparison signal, the demagnetizing oscillation detector generates the demagnetizing oscillation signal.

17. The power supply of claim 15, wherein the demagnetizing oscillation detector comprises a XOR gate and a low level trigged flip-flop controlled by the conduction time interval signal.

18. The power supply of claim 15, wherein the first current source having a current value of k1, the second current source having a current value of k2, and the third current source having a current value of (k1+k2)/2, and wherein k1 and k2 are positive numbers.

19. The power supply of claim 15, further comprising a NOR gate configured to receive the constant current control signal and a constant voltage control signal, wherein based on the constant current control signal and the constant voltage control signal, the NOR gate generates the control signal to control the power switch.

20. The power supply of claim 15, wherein the flip-flop comprises a RS trigger.

* * * * *